United States Patent
Iwashima (10) Patent No.: US 8,570,584 B2
(45) Date of Patent: Oct. 29, 2013

(54) IMAGE FORMING APPARATUS INCLUDING HARD DISK STORAGE UNIT, AND DATA DISPLAY METHOD

(75) Inventor: Yasuhiro Iwashima, Osaka (JP)

(73) Assignee: Kyocera Mita Corporation (JP)

(*) Notice: Subject to any disclaimer, the term of this patent is extended or adjusted under 35 U.S.C. 154(b) by 419 days.

(21) Appl. No.: 12/715,850

(22) Filed: Mar. 2, 2010

(65) Prior Publication Data

US 2010/0225970 A1 Sep. 9, 2010

(30) Foreign Application Priority Data

Mar. 4, 2009 (JP) ................................ 2009-050468

(51) Int. Cl.
*G06K 15/00* (2006.01)

(52) U.S. Cl.
USPC ........ 358/1.16; 358/1.14; 358/1.15; 714/815; 714/4.11; 714/E11.195

(58) Field of Classification Search
USPC .............. 358/1.14, 1.15, 1.16; 714/815, 4.11, 714/E11.195
See application file for complete search history.

(56) References Cited

U.S. PATENT DOCUMENTS

| | | | |
|---|---|---|---|
| 6,246,487 B1 | 6/2001 | Kobayashi et al. | |
| 6,268,925 B1 * | 7/2001 | Yamanaka | 358/1.14 |
| 6,968,451 B2 * | 11/2005 | Neuman | 713/1 |
| 8,259,362 B2 * | 9/2012 | Narukawa | 358/449 |
| 2001/0017708 A1 | 8/2001 | Kobayashi et al. | |
| 2005/0039007 A1 * | 2/2005 | Hoene et al. | 713/170 |
| 2005/0138447 A1 | 6/2005 | Kobayashi et al. | |
| 2005/0146731 A1 * | 7/2005 | Mitani | 358/1.1 |
| 2006/0029412 A1 | 2/2006 | Kato et al. | |
| 2006/0101301 A1 * | 5/2006 | Nagao et al. | 713/600 |
| 2006/0107849 A1 * | 5/2006 | Furuhashi | 101/113 |
| 2007/0106995 A1 * | 5/2007 | Osaka | 718/106 |
| 2007/0296998 A1 | 12/2007 | Iwamoto et al. | |

FOREIGN PATENT DOCUMENTS

| | | |
|---|---|---|
| JP | 2003220742 | 8/2003 |
| JP | 2004-74621 | 3/2004 |
| JP | 2005-193652 | 7/2005 |
| JP | 2006-95741 | 4/2006 |

* cited by examiner

*Primary Examiner* — Benny Q Tieu
*Assistant Examiner* — Quyen V Ngo
(74) *Attorney, Agent, or Firm* — Gerald E. Hespos; Michael J. Porco; Matthew T. Hespos (57) ABSTRACT

An image forming apparatus includes: a hard disk storage unit for storing user registered data; a display unit for displaying the user registered data in a user selectable state; a power supply unit for supplying power to the hard disk storage unit; a power supply control unit for interrupting or starting power supply to the hard disk storage unit; a switch memory for storing at least a part of the user registered data stored in the hard disk storage unit; and an access switching unit for displaying the user registered data stored in the switch memory on the display unit in a user selectable state when the power supply from the power supply unit to the hard disk storage unit is started.

16 Claims, 10 Drawing Sheets

FIG. 9 imacy # IMAGE FORMING APPARATUS INCLUDING HARD DISK STORAGE UNIT, AND DATA DISPLAY METHOD

BACKGROUND OF THE INVENTION

1. Field of the Invention

The present invention relates to an image forming apparatus, and more particularly to an image forming apparatus including a hard disk storage device for storing user registered data, and to a data display method.

2. Description of the Related Art

Various functions are appended to an image forming apparatus. For example, many image forming apparatuses have a standby function in which the image forming apparatus enters a sleep state (a resting state) when the apparatus is in the state not to be used in order to reduce power consumption. In the background art, a technique with which an image forming apparatus can be switched to a sleep state while satisfying a printing interruption request in order to respond to a printing interruption request in the sleep state has been disclosed.

In an image forming apparatus having this function, the image forming apparatus must first be restored to an active state from the sleep state. At such times, a user wishes to use the image forming apparatus immediately, and therefore a transition period from the sleep state to the active state is preferably as short as possible. During the transition from the sleep state to the active state, the process that takes the longest time is HDD (Hard Disk Drive) operation preparation. A wait period of approximately 15 seconds following power supply to the HDD is required for disk rotation to stabilize so that the HDD can read data. During this wait period, data stored on the HDD cannot be accessed.

In another conventional technique, a program provided in the HDD for restoring the image forming apparatus to the active state is stored in a non-volatile memory. In this apparatus, the program is read from the non-volatile memory when the image forming apparatus is restored to the active state, and therefore the transition period from the sleep state to the active state is shortened.

However, with the image forming apparatus according to this conventional technique, user registered data may be stored on the HDD, and therefore, even though the program can be activated immediately, the data cannot be used while the program is in use until HDD operation preparation is complete. In other words, even though the transition period to the active state is shortened such that operation preparation is completed in devices other than the HDD, the data in the HDD cannot be used until operation preparation in the HDD is complete. Examples of these data include documents, FAX numbers, and so on registered by the user.

Many users wish to use the image forming apparatus employing the data in the HDD while waiting for the completion of operation preparation in the HDD. In response to this demand, all of the data in the HDD may be stored in a non-volatile memory so that the data are accessed from the memory, for example. However, a non-volatile memory having a sufficient capacity to store all of the data in the HDD would be extremely expensive and is therefore unrealistic.

SUMMARY OF THE INVENTION

An object of the present invention is to provide an image forming apparatus with which data in an HDD can be used while waiting for the completion of operation preparation in the HDD.

To achieve this object, an image forming apparatus according to an aspect of the present invention includes: a hard disk storage unit for storing user registered data registered by a user; a display unit for displaying the user registered data in a user selectable state; a power supply unit for supplying power to the hard disk storage unit; a power supply control unit for interrupting or starting power supply to the hard disk storage unit by the power supply unit; a switch memory for storing at least a part of the user registered data stored in the hard disk storage unit; and an access switching unit for displaying the user registered data stored in the switch memory on the display unit in a user selectable state when the power supply control unit starts the power supply from the power supply unit to the hard disk storage unit.

A data display method according to another aspect of the present invention is a method for displaying user registered data stored in a hard disk storage unit on a display unit, and includes: preparing a state in which at least a part of the user registered data stored in the hard disk storage unit is stored in a switch memory before power supply to the hard disk storage unit is started; starting the power supply to the hard disk storage unit; displaying the user registered data stored in the switch memory on the display unit after the power supply to the hard disk storage unit is started until operation preparation in the hard disk storage unit is complete; and switching a data access destination when the operation preparation in the hard disk storage unit is complete such that the user registered data stored in the hard disk storage unit, rather than the user registered data stored in the switch memory, are displayed on the display unit.

DETAILED DESCRIPTION OF THE PREFERRED EMBODIMENTS (Image Forming Apparatus)

Figure 1:
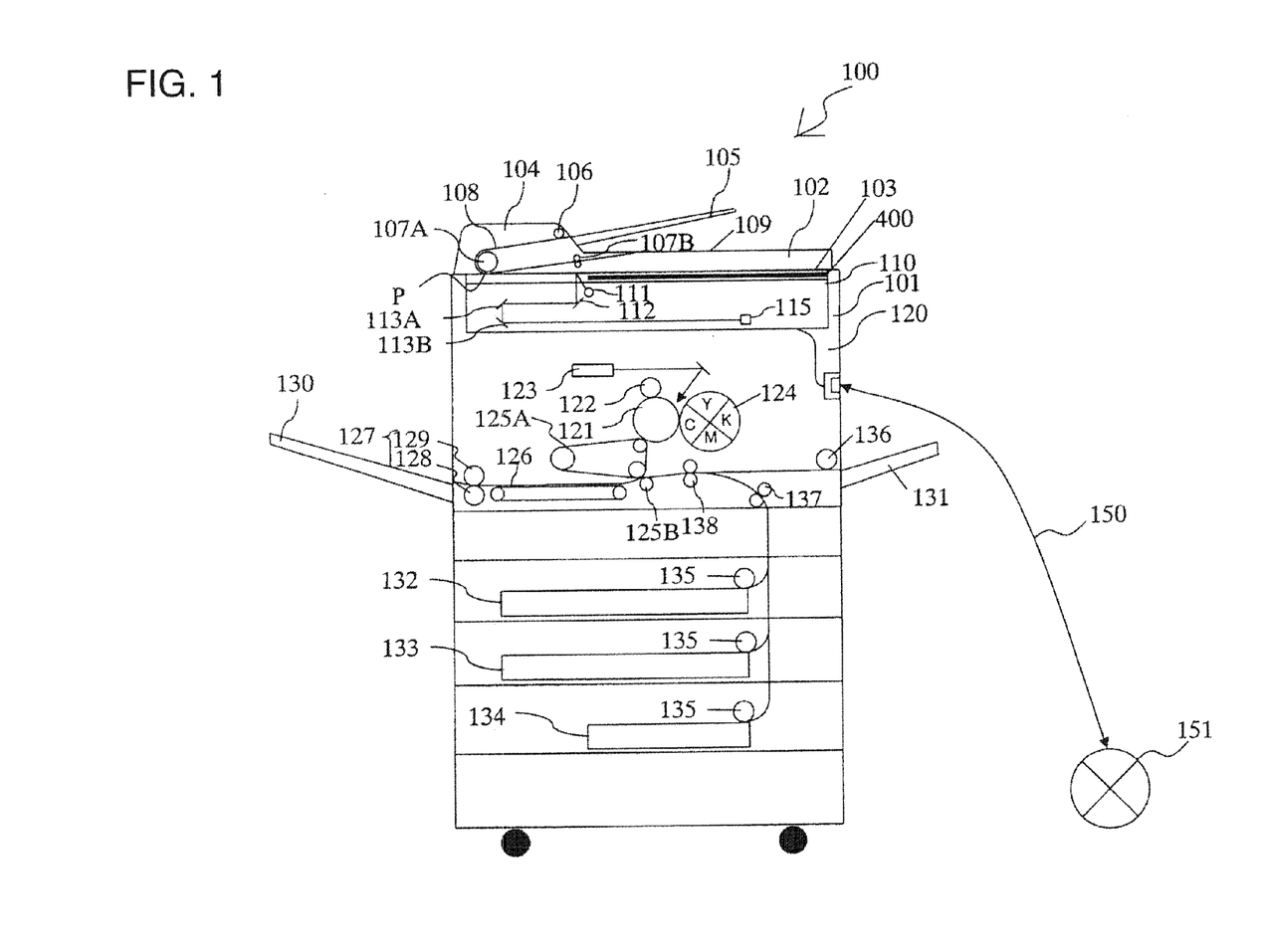
FIG. 1 is a view showing the overall constitution of an image forming apparatus according to an embodiment of the present invention.

Basic copying service processing executed by an image forming apparatus will be described below. An image forming apparatus according to an embodiment of the present invention corresponds to a complex machine including a printer, a copier, a scanner, a facsimile, and so on, a digital copier, a printer, and so on, and functions as an image forming apparatus including a copying service, a scanning service, a facsimile service, a printing service, and so on. Here, a complex machine will be used as an example of the image forming apparatus. FIG. 1 is a schematic pattern diagram of a complex machine 100. Note that units not directly related to the present invention will not be described in detail.

The complex machine 100 includes a main body 101 and a platen cover 102 attached to the top of the main body 101. A platen 103 is provided on an upper surface of the main body 101, and an upper surface of the platen 103 is opened and closed by the platen cover 102. The platen cover 102 is provided with an automatic original feeding device 104, a carrying table 105, and a sheet discharge table 109.

When a user uses the complex machine 100 to print an original, for example, she or he disposes the original on the platen 103 or the carrying table 105 and issues a printing instruction to an operating unit 400 provided in the vicinity of the platen 103. When the instruction is issued, respective units (drive units) to be described below are operated such that printing is performed.

Figure 2:
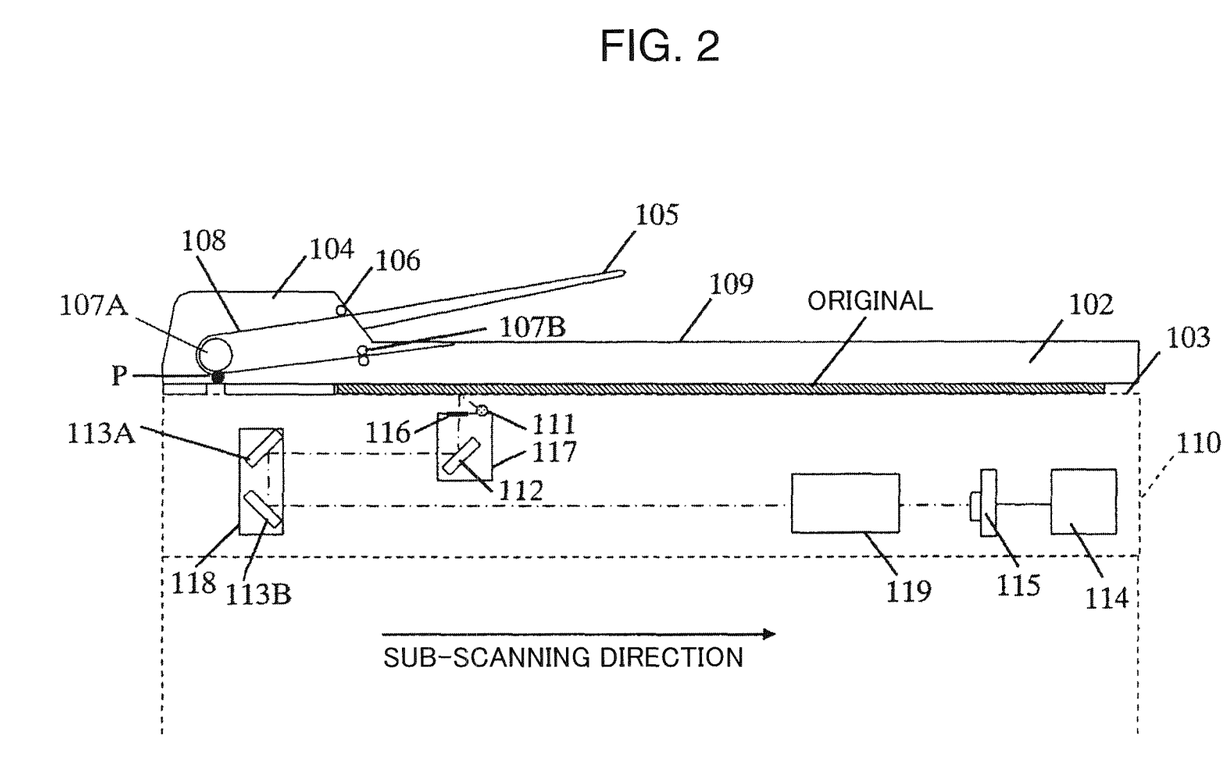
FIG. 2 is a view showing the constitution of a reading unit of the image forming apparatus.

A reading unit 110 is provided below the platen 103. FIG. 2 shows the reading unit 110 in detail. The reading unit 110 includes a first moving carriage 117 and a second moving carriage 118. The first moving carriage 117 includes a light source 111 that is long in a main scanning direction for irradiating the original 103, a slit 116 through which light from the platen is passed selectively, and a mirror 112 that guides the light from the platen. The second moving carriage 118 includes mirrors 113A, 113B that reflect back reflection light from the first moving carriage 117. The reading unit 110 further includes a lens group 119 for optically correcting light guided by the mirrors 113A, 113B, an imaging device 115 that receives the light corrected by the lens group 119, and an image data generation unit 114 that converts the light received by the imaging device 115 into an electric signal and performs correction/adjustment and so on if necessary.

When an original is read from the automatic original feeding device 104, the light source 111 emits light after moving to a position in which a reading position P can be irradiated. The light from the light source 111 passes through the platen 103, and is then reflected by the original traveling over the reading position P and guided to the imaging device 115 by the slit 116, the mirrors 112, 113A, 113B, and the lens group 119. The imaging device 115 converts the received light into an electric signal and transmits the electric signal to the image data generation unit 114.

The light received by the imaging device 115 is input into the image data generation unit 114 as R (red), G (green) and B (blue) analog electric signals, whereupon the analog electric signals are subjected to analog-digital conversion, or in other words digitization. Further, the image data generation unit 114 generates image data constituted by a plurality of unit data by setting successively converted digital signals as unit data and then subjecting the unit data to correction, adjustment, and so on.

When the reading unit 110 reads an original placed on the platen 103, the first moving carriage 117 moves in a sub-scanning direction while the light source 111 emits light. To maintain an optical path from the light source 111 to the imaging device 115 at a constant length, the second moving carriage 118 moves in the direction of the imaging device 115 at ½ the speed of the first moving carriage 117.

The imaging device 115 converts light from the original placed on the platen 103 into an electric signal on the basis of the light guided to the mirrors 112, 113A, 113B. The image data generation unit 114 generates the image data on the basis of this electric signal.

A printing unit 120 for printing the image data is provided in the main body 101 below the reading unit 110. The printing unit 120 is capable of printing images generated by the image data generation unit 114 in the manner described above and images transmitted together with an image formation instruction from a network 151 via a communication cable 150 connected to the complex machine 100.

The printing unit 120 employs an electrophotographic method as a printing method. More specifically, a photosensitive drum 121 is uniformly charged by a charger 122, the photosensitive drum 121 is irradiated by a laser 123 such that a latent image is formed on the photosensitive drum 121, toner is adhered to the latent image by a developer 124 to form a visible image, and the visible image is transferred onto a sheet by a transfer roller 125B.

The sheet on which the visible image is printed is placed in a sheet feeding tray such as a manual tray 131 or sheet feeding cassettes 132, 133, 134 and supplied to the printing unit 120 therefrom.

When printing is performed by the printing unit 120, a single sheet is extracted from one of the sheet feeding trays using a pickup roller 135, whereupon the extracted sheet is conveyed between an intermediate transfer belt 125A and the transfer roller 125B by a conveyance roller 137 and a resist roller 138. When extracting a sheet, a sheet placed in the manual tray 131 may be extracted using a manual tray pickup roller 136.

The printing unit 120 transfers a visible image formed on the intermediate transfer belt 125A onto the sheet conveyed between the intermediate transfer belt 125A and the transfer roller 125B, and then conveys the sheet to a fixing device 127 using a conveyance belt 126 in order to fix the visible image onto the sheet. The fixing device 127 is constituted by a heating roller 128 having a built-in heater and a pressure roller 129 that is pressed against the heating roller 128 with a predetermined pressure. When the sheet passes between the heating roller 128 and the pressure roller 129, the visible image is fixed onto the sheet by heat and pressure. Once the sheet has passed through the fixing device 127, the printing unit 120 discharges the sheet to a sheet discharge tray 130.

The basic copying service processing executed by the complex machine 100 was described above. Note that by operating the respective units (the reading unit 110 and the printing unit 120) described above in appropriate combinations, the complex machine 100 can provide the user with other functions, for example a facsimile transmission/reception function, a printing function, a scanning function, a post processing function, a memory function, and so on.

Figure 3:
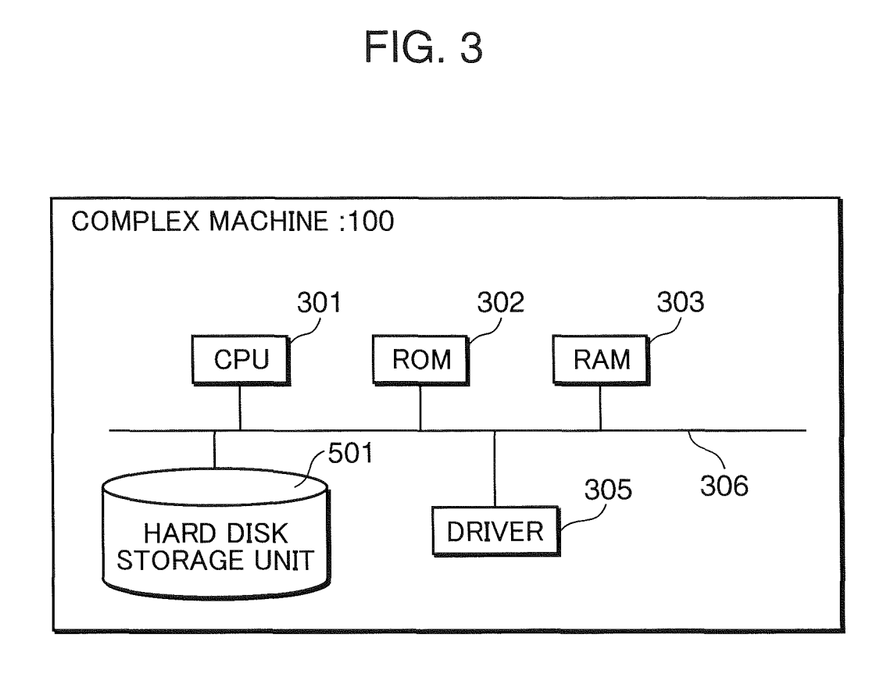
FIG. 3 is a view showing the constitution of control system hardware of the image forming apparatus.

Next, using FIG. 3, the constitution of control system hardware provided in the complex machine 100 will be described. FIG. 3 is a schematic constitutional diagram of the control system hardware of the complex machine 100. Note that units not directly related to the present invention will not be described in detail.

A control circuit of the complex machine 100 includes a CPU (Central Processing Unit) 301, a ROM (Read Only Memory) 302, a RAM (Random Access Memory) 303, a hard disk storage unit 501, and a driver 305 corresponding to each drive unit, these components being connected by an internal bus 306. The CPU 301 uses the RAM 303 as an operating area to execute programs stored in the ROM 302, the hard disk storage unit 501, and so on, for example, and on the basis of execution results, the CPU 301 receives data and instructions from the driver 305 and the operating unit 400 and controls operations of the respective drive units and so on shown in FIGS. 1 and 2. Note that the RAM 303 may be constituted by a switch memory 512 to be described below, or the switch memory 512 may be provided separately to the RAM 303.

Figure 4:
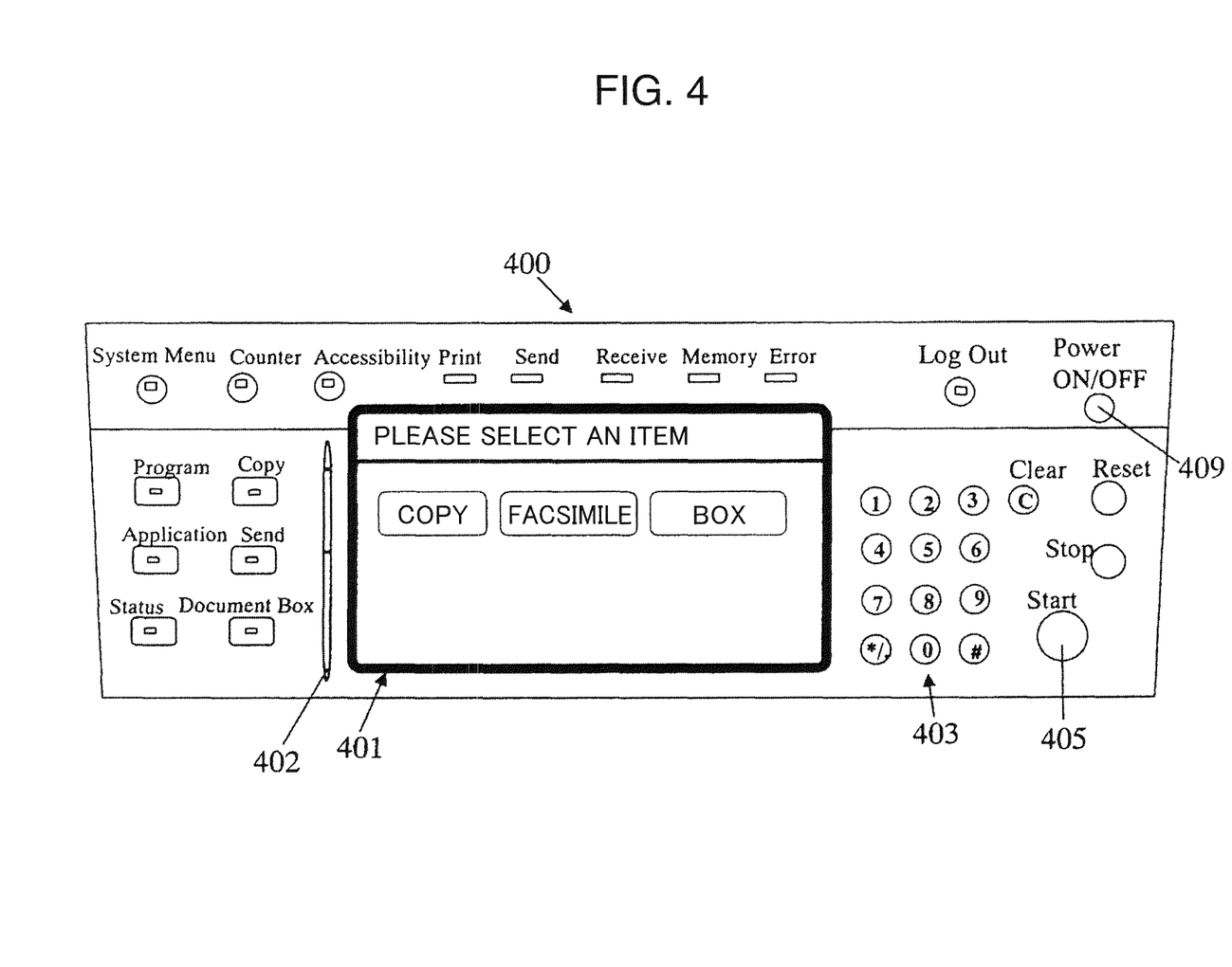
FIG. 4 is a view showing an operating unit of the image forming apparatus.

FIG. 4 is a view showing an example of the outer form of the operating unit 400 provided on the complex machine 100. The user uses the operating unit 400 to input setting conditions and the like relating to provision of the functions described above. The user uses a touch panel 401, a touch pen 402, and operating keys 403 provided on the operating unit 400 to input the setting conditions, begin execution of the various services, and so on.

(First Embodiment)

Figure 5:
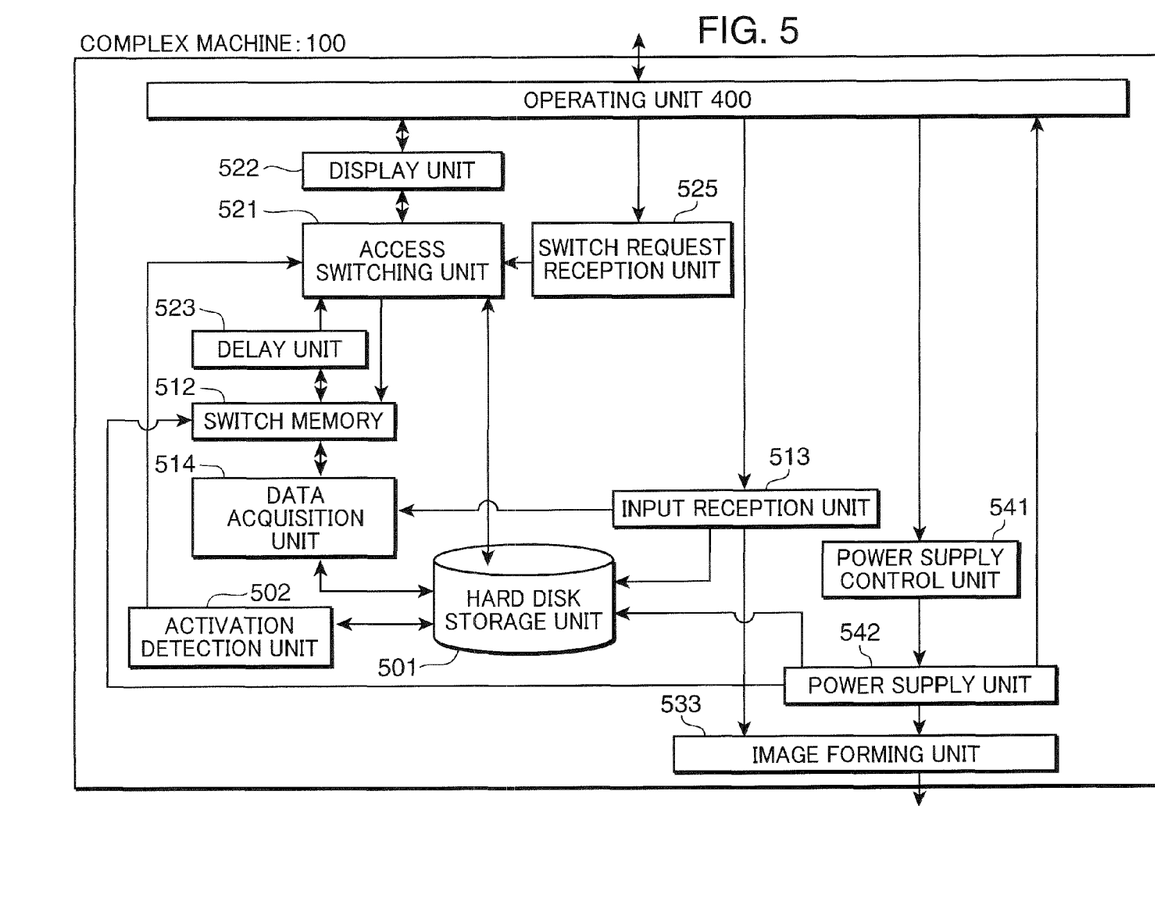
FIG. 5 is a functional block diagram of an image forming apparatus according to a first embodiment.
Figure 6:
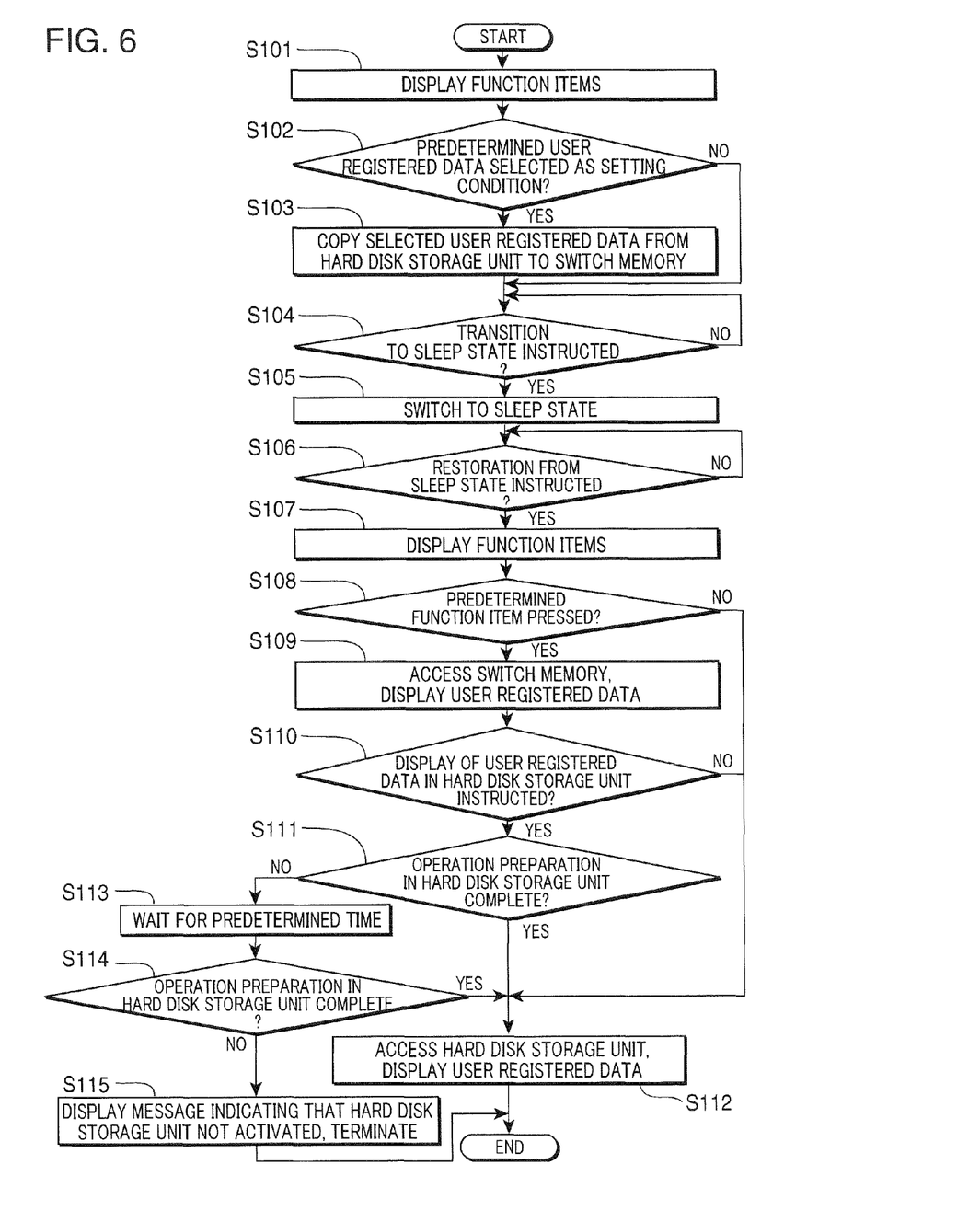
FIG. 6 is a flowchart showing access switching processing in the image forming apparatus according to the first embodiment.

Next, access switching processing executed by the complex machine 100 according to this embodiment will be described with reference to the drawings. FIG. 5 is a functional block diagram of the complex machine 100 according to the first embodiment, and FIG. 6 is a flowchart showing the access switching processing performed by the complex machine 100 according to the first embodiment.

The complex machine 100 includes, in addition to the operating unit 400 and hard disk storage unit 501 described above, the switch memory 512, an input reception unit 513, a data acquisition unit 514, an activation detection unit 502, an access switching unit 521, a display unit 522, a delay unit 523, a switch request reception unit 525, an image forming unit 533, a power supply unit 542, and a power supply control unit 541.

The hard disk storage unit 501 is a recording device for recording data onto a disk that rotates at high speed. Power from the power supply unit 542 is supplied to the hard disk storage unit 501. When rotation of the disk stabilizes after a wait period of approximately 15 seconds following the start of power supply, the data stored on the disk can be read. Note that when the complex machine 100 is in a sleep state, the power supply from the power supply unit 542 to the hard disk storage unit 501 is interrupted. The hard disk storage unit 501 stores various data including user registered data, which are data registered in advance by the user such as documents and facsimile numbers.

The switch memory 512 stores a copy of at least a part of the user registered data stored in the hard disk storage unit 501. In contrast to the hard disk storage unit 501, the switch memory 512 is a semiconductor memory capable of reading data immediately, i.e. without the need for a wait period, following energization.

The input reception unit 513 receives an operation for inputting information from the user relating to various setting conditions. For example, the input reception unit 513 receives a registration setting of a transmission destination facsimile number. The input facsimile number or other information is stored in the hard disk storage unit 501, and if necessary, a copy thereof is stored in the switch memory 512.

The data acquisition unit 514 performs processing to store a copy of the user registered data stored in the hard disk storage unit 501 in the switch memory 512 when a predetermined instruction signal is issued thereto.

The activation detection unit 502 determines whether or not operation preparation in the hard disk storage unit 501 is complete. The activation detection unit 502 detects a rotation state of the disk following the start of power supply to the hard disk storage unit 501 from the power supply unit 542, for example, and determines whether or not the wait period is complete, or in other words whether or not operation preparation in the hard disk storage unit 501 is complete.

The access switching unit 521 switches an access destination (data reading destination) of user registered data displayed on the display unit 522 between the hard disk storage unit 501 and the switch memory 512. When restoring the complex machine 100 to an active state from the sleep state, the access switching unit 521 sets the switch memory 512 as the data access destination at a timing where power supply from the power supply unit 542 to the hard disk storage unit 501 begins. As a result, the user registered data stored in the switch memory 512 are displayed on the display unit 522 in a user selectable state.

Further, the access switching unit 521 modifies the data access destination from the switch memory 512 to the hard disk storage unit 501 at a timing where the completion of operation preparation in the hard disk storage unit 501 is detected by the activation detection unit 502. As a result, the user registered data stored in the hard disk storage unit 501 are displayed on the display unit 522.

The display unit 522 performs processing to display the user registered data on the touch panel 401 in the user selectable state.

The delay unit 523 delays a response time (the time required for data reading) of the switch memory 512 to a response time of the hard disk storage unit 501. The delay unit 523 is provided to ensure that the user is not surprised by a difference in response time when the data access destination is switched.

The switch request reception unit 525 receives a user instruction to display the user registered data stored in the hard disk storage unit 501. When the user issues an instruction while the user registered data read from the switch memory 512 are displayed on the display unit 522, the switch request reception unit 525 issues an instruction signal to the access switching unit 521 to modify the access destination of the user registered data to the hard disk storage unit 501.

The image forming unit 533 includes the printing unit 120 and the fixing device 127 shown in FIG. 1, and performs image forming processing on a sheet. The image forming unit 533 includes electric instruments that consume a comparatively large amount of power, such as a motor and a solenoid for driving the various rollers and driven components, a heater, and a light source, and members that consume a comparatively small amount of power such as a control circuit board.

The power supply unit 542 supplies power to the hard disk storage unit 501, the switch memory 512, the image forming unit 533, and the respective units of the complex machine 100.

The power supply control unit 541 controls power supply to the respective units by the power supply unit 542. In this embodiment in particular, the power supply control unit 541 interrupts and starts power supply to the hard disk storage unit 501.

The complex machine 100 according to this embodiment can be switched between the active state, in which the various functions of the complex machine 100 can be provided to the user, and the sleep state, in which power consumption is suppressed. When the complex machine 100 is restored to the active state from the sleep state, user registered data such as a facsimile number can be used even if operation preparation in the hard disk storage unit 501 is incomplete.

Here, the active state is a state in which the power supply control unit 541 causes the power supply unit 542 to supply power to a predetermined location of the complex machine 100 such that power is supplied to the image forming unit 533 (drive units such as motors that consume a comparatively large amount of power) of the complex machine 100. The sleep state is a state in which the power supply control unit 541 causes the power supply unit 542 to supply a comparatively small amount of power to a location for driving the control circuit board and so on and interrupt the power for driving the motors and other drive units.

The user performs the following operation to use the user registered data while the complex machine 100 is in the active state. Here, boxes serving as file storage areas are allocated to the hard disk storage unit 501 in addition to the aforementioned facsimile numbers, and files (document files or image files) stored in the boxes are also stored as user registered data. The boxes correspond to so-called folders, and include a user box for each user and a shared box that can be accessed by a plurality of users, for example.

Figure 7A:
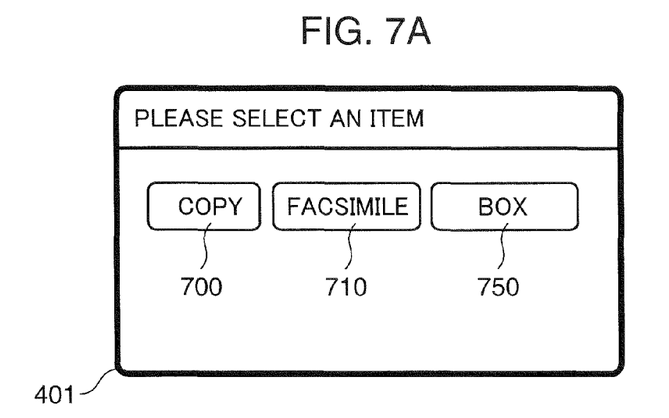
FIGS. 7A to 7C are views showing screens displayed on the operating unit.

First, the display unit 522 displays function item keys constituted by a copy item key 700, a facsimile item key 710, and a box item key 750 on the touch panel 401 of the operating unit 400, as shown in FIG. 7A (step S101 in a flowchart shown in FIG. 6). Here, a case in which the user uses a facsimile number as the user registered data is envisaged. In this case, the user presses the facsimile item key 710 from the function item keys described above. When the facsimile item key 710 is pressed, the access switching unit 521 accesses facsimile numbers stored in the hard disk storage unit 501.

Figure 7B:
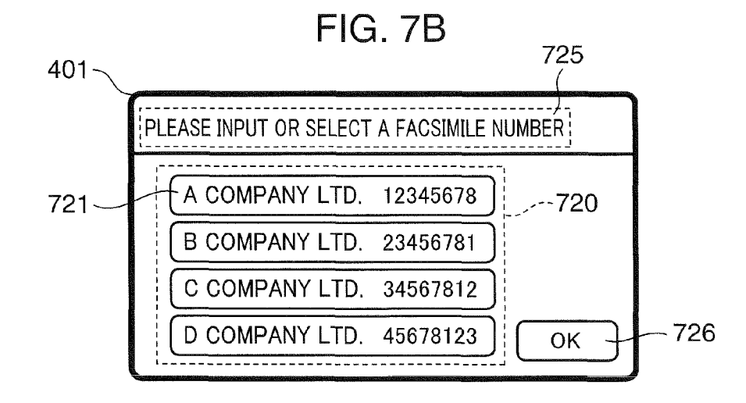

Next, the access switching unit 521 issues a control signal to the display unit 522 to display the user registered data in a user selectable state, or in other words such that the user registered data can be used for image formation. Upon reception of the control signal, the display unit 522 displays the user registered data on the touch panel 401 in the user selectable state. For example, as shown in FIG. 7B, the display unit 522 displays a pre-registered facsimile number list 720 on the touch panel 401 together with a message 725 prompting facsimile number input or facsimile number selection.

A case in which the user selects a facsimile number 721 of A Company Ltd. from the facsimile list 720 displayed on the touch panel 401 and then presses an OK key 726 will be envisaged hereafter. In this case, the input reception unit 513 receives the facsimile number of A Company Ltd. as a setting condition, and issues an instruction signal to the data acquisition unit 514 to store a copy of (to be referred to hereafter as "to copy") the facsimile number to the switch memory 512 from the hard disk storage unit 501. Upon reception of the instruction signal, the data acquisition unit 514 copies data relating to the facsimile number of A Company Ltd. to the switch memory 512 from the hard disk storage unit 501.

Note that in another embodiment, the user is asked whether the user registered data received as the setting condition are to be used again. In this case, only user registered data for which the user has indicated reuse are copied to the switch memory 512 from the hard disk storage unit 501.

When the user inputs a new facsimile number in response to the message 725 prompting facsimile number input displayed on the display unit 522, the new facsimile number is stored in the hard disk storage unit 501 as user registered data and copied to the switch memory 512. A specific example of this processing will now be described. When the user inputs a new facsimile number and presses the OK key 726, the input reception unit 513 receives the new facsimile number as user registered data and stores the new facsimile number in the hard disk storage unit 501. The input reception unit 513 then notifies the data acquisition unit 514 that the user registered data have been stored in the hard disk storage unit 501. Having received this notification, the data acquisition unit 514 copies the user registered data to the switch memory 512 from the hard disk storage unit 501.

By performing the operation described above repeatedly, user registered data (facsimile numbers, for example) received by the input reception unit 513 are stored in the switch memory 512 (YES in step S102 of FIG. 6 to step S103).

Further, when the user registered data in the hard disk storage unit 501 are copied to the switch memory 512, the data may exceed the capacity of the switch memory 512. In this case, the data acquisition unit 514 overwrites the user registered data to a memory area in which the least recently copied user registered data are recorded, from among the user registered data currently copied to the switch memory 512. By employing this constitution, frequently used user registered data are copied to the switch memory 512. Hence, when the display unit 522 displays the user registered data, frequently accessed user registered data can be displayed. Note that when the switch memory 512 has sufficient storage capacity to store all of the user registered data, all of the user registered data displayed by the display unit 522 may be copied to the switch memory 512 from the hard disk storage unit 501.

In this embodiment, user registered data are copied to the switch memory 512 many times. Therefore, a volatile memory having no writing limit is preferably used as the switch memory 512.

Furthermore, when a volatile memory is used as the switch memory 512, the switch memory 512 can receive power supply from the power supply unit 542 or another power source such as a battery at all times, regardless of whether the complex machine 100 is in the sleep state or the active state. The stored content of a volatile memory disappears when the power supply is interrupted, and therefore, in a case where the switch memory 512 is constituted by a volatile memory, the stored content thereof can be prevented from disappearing by employing a constitution in which the switch memory 512 receives a constant supply of power even when the complex machine 100 is in the sleep state.

When the operation of the complex machine 100 is complete and the user presses a power supply ON/OFF key 409 on the operating unit 400, or when a predetermined amount of time elapses without any user operations, a control unit, not shown in the drawings, issues a control signal to the power supply control unit 541, which contains an instruction to switch the complex machine 100 to the sleep state. Having received the sleep state transition instruction, the power supply control unit 541 switches the complex machine 100 to the sleep state by interrupting the power supply from the power supply unit 542 to the hard disk storage unit 501, the drive units of the image forming unit 533, and so on. In the sleep state, a comparatively small amount of power sufficient for driving circuit boards such as the CPU is supplied, but the power for driving the motors and other drive units is interrupted (YES in step S104 to step S105).

When the user presses the power supply ON/OFF key 409 or any other key on the complex machine 100 in the sleep state, the sleep state is canceled. When the user presses a key, the power supply control unit 541 receives a resumption signal generated as the key is pressed. Having received the resumption signal, the power supply control unit 541 causes the power supply unit 542 to start supplying power to the hard disk storage unit 501 and the image forming unit 533 (YES in step S106).

At this time, a wait period occurs from the start of power supply by the power supply unit 542 to the completion of operation preparation in the hard disk storage unit 501. This wait period is an amount of time (a spin-up time) required for rotation of the disk in the hard disk storage unit 501 to stabilize so that data can be read following the start of power supply to the hard disk storage unit 501. During the wait period, the hard disk storage unit 501 cannot be accessed, and therefore data cannot be read. The wait period varies in accordance with the performance and specs of the hard disk storage unit 501 and the performance of a reading member used in relation to the hard disk storage unit 501, but typically lasts for approximately 15 seconds.

The activation detection unit 502 determines whether or not operation preparation in the hard disk storage unit 501 is complete. After determining that operation preparation in the hard disk storage unit 501 is complete, the activation detection unit 502 notifies the access switching unit 521 that operation preparation in the hard disk storage unit 501 is complete.

Note that a program required for activation and a program used for jobs that do not require the user registered data (a normal copying service, for example) are stored in the ROM 302. Therefore, a normal copying service that does not use the user registered data can be provided during the wait period in which the hard disk storage unit 501 cannot be accessed.

When the power supply unit 542 begins to supply power, the display unit 522 displays the function item keys constituted by the copy item key 700, the facsimile item key 710, and the box item key 750 on the touch panel 401 (step S107).

When the user wishes to use the user registered data (a facsimile number or a file contained in a box) during the wait period, i.e. before operation preparation in the hard disk storage unit 501 is complete, the user registered data stored in the switch memory 512 are read and displayed. For example, when the user presses the facsimile item key 710 from the function item keys, the display unit 522 receives an operation signal generated in accordance with depression of the facsimile item key 710 (YES in step S108).

Figure 7C:
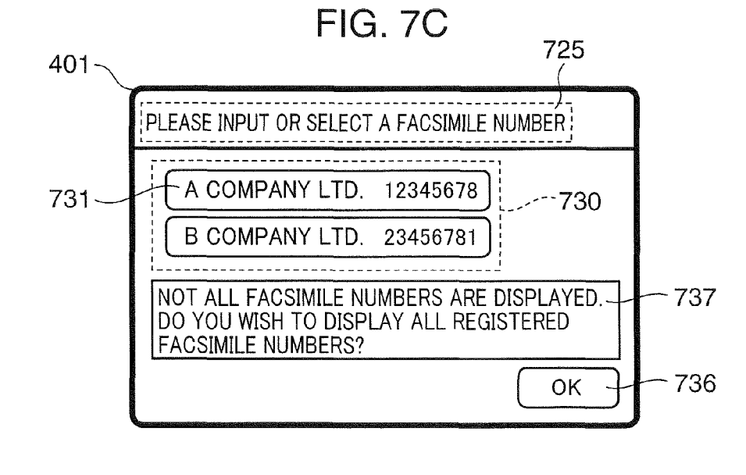

When the display unit 522 receives the operation signal generated in accordance with depression of the facsimile item key 710, the access switching unit 521 accesses the switch memory 512 and causes the display unit 522 to display the user registered data stored in the switch memory 512. For example, the display unit 522 displays a facsimile number list 730 stored in the switch memory 512 together with the message 725 prompting the user to input a facsimile number or select a facsimile number on the touch panel 401, as shown in FIG. 7C (step S109).

The user then selects a facsimile number 731 of A Company Ltd. from the facsimile number list 730 displayed on the touch panel 401 and then presses an OK key 736. In this case, the input reception unit 513 receives the facsimile number as a setting condition, and the image forming unit 533 performs a facsimile job.

As described above, the switch memory 512 does not store all of the user registered data stored in the hard disk storage unit 501. At this stage, the display unit 522 displays the user registered data stored in the switch memory 512, and therefore the user registered data that the user wishes to use may not be displayed. Hence, the display unit 522 displays a message 737 indicating that not all of the user registered data are displayed and requesting confirmation as to whether all of the user registered data should be displayed on the touch panel 401. When the user registered data that the user wishes to use are not displayed, the user selects the message 737 and then presses the OK key 736. When this operation is performed, the switch request reception unit 525 receives an instruction signal instructing it to display the user registered data stored in the hard disk storage unit 501 (YES in step S110).

Upon reception of the instruction signal, the switch request reception unit 525 asks the access switching unit 521 if the hard disk storage unit 501 is accessible. When the notification indicating that operation preparation in the hard disk storage unit 501 is complete has been received from the activation detection unit 502, the access switching unit 521 determines that access is possible. The access switching unit 521 then switches the access destination of the user registered data from the switch memory 512 to the hard disk storage unit 501 and causes the display unit 522 to display the user registered data stored in the hard disk storage unit 501 (YES in step S111 to step S112).

When the notification indicating that operation preparation in the hard disk storage unit 501 is complete has not been received from the activation detection unit 502, on the other hand, the access switching unit 521 determines that access is not possible. In this case, the access switching unit 521 waits for the predetermined period required to complete operation preparation in the hard disk storage unit 501 (NO in step S111 to step S113). During the wait period, the access switching unit 521 may issue an instruction signal to the display unit 522 to display a message indicating a predetermined wait period on the touch panel 401.

When the wait period elapses such that the access switching unit 521 receives the notification indicating that operation preparation in the hard disk storage unit 501 is complete from the activation detection unit 502, the access switching unit 521 switches the access destination of the user registered data from the switch memory 512 to the hard disk storage unit 501. As a result, the user registered data stored in the hard disk storage unit 501 are displayed on the touch panel 401 by the display unit 522 (YES in step S114 to step S112).

When operation preparation in the hard disk storage unit 501 remains incomplete even after the elapse of the predetermined period, on the other hand, the activation detection unit 502 notifies the access switching unit 521 thereof. Upon reception of this notification, the access switching unit 521 causes the display unit 522 to display a message on the touch panel 401 indicating that the hard disk storage unit 501 is not activated, whereupon the control routine is terminated (NO in step S114 to step S115 to END).

(Second Embodiment)

An operation of the complex machine 100 according to a second embodiment will now be described on the basis of a flowchart shown in FIG. 8. Note that the hardware constitution of the second embodiment is identical to the first embodiment. The second embodiment differs from the first embodiment in that when operation preparation in the hard disk storage unit 501 is complete, the user registered data stored in the hard disk storage unit 501 are displayed without waiting for an instruction from the user to switch the access destination of the user registered data from the switch memory 512 to the hard disk storage unit 501 and then display the user registered data.

Figure 8:
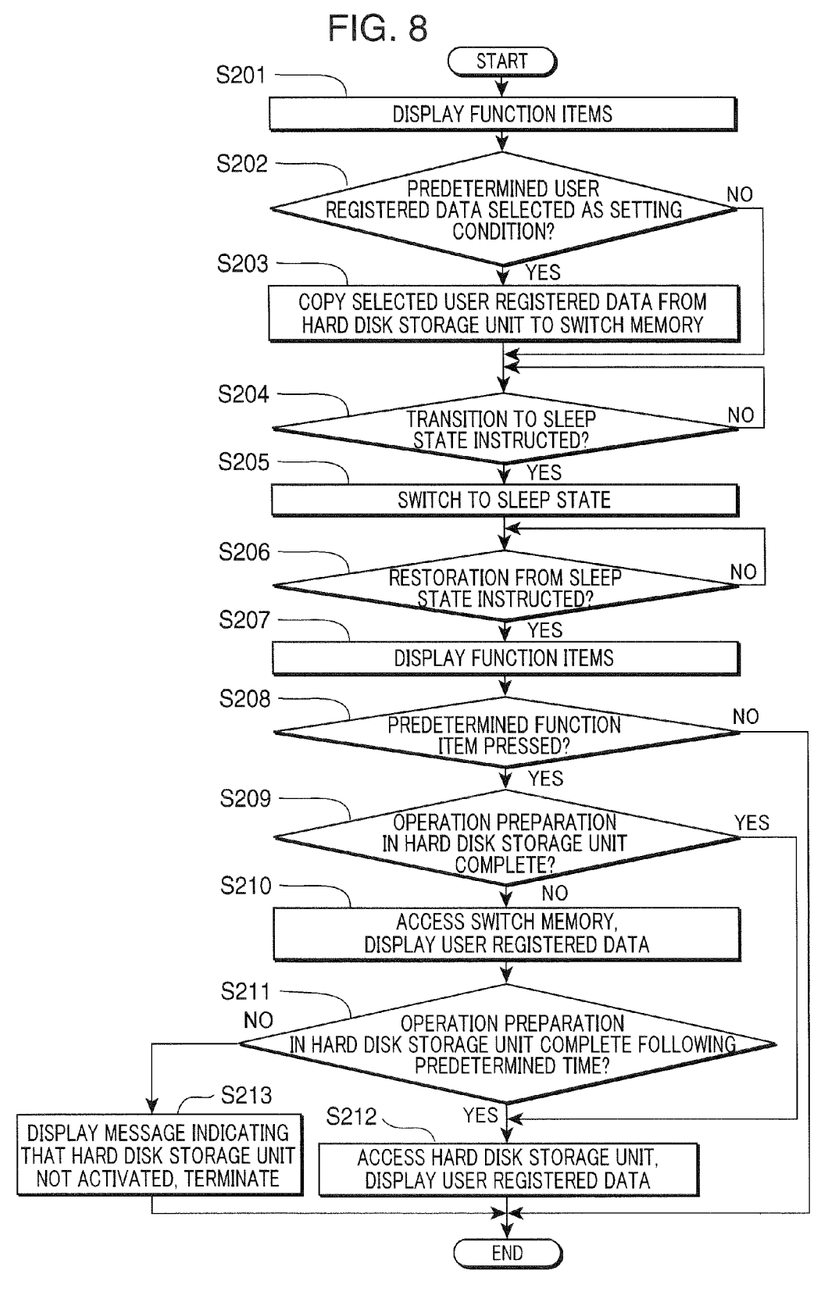
FIG. 8 is a flowchart showing access switching processing in an image forming apparatus according to a second embodiment.

Steps S201 to S208 in FIG. 8 correspond to the procedures of steps S101 to S108 in the first embodiment, and therefore description thereof is omitted here.

When the power supply unit 542 begins to supply power in accordance with a restoration instruction from the sleep state, the display unit 522 displays the function item keys constituted by the copy item key 700, the facsimile item key 710, and the box item key 750 on the touch panel 401. A case in which the user uses the user registered data during the wait period, i.e. before operation preparation in the hard disk storage unit 501 ends, is envisaged. For example, when the user presses the facsimile item key 710, the display unit 522 receives an instruction signal to display the content of the facsimile item key 710 (YES in step S208).

After receiving the instruction to display the content of the facsimile item key 710, the display unit 522 asks the access switching unit 521 if the hard disk storage unit 501 is accessible. When the notification indicating that operation preparation in the hard disk storage unit 501 is complete has not been received from the activation detection unit 502, the access switching unit 521 determines that access is impossible. The access switching unit 521 then accesses the switch memory 512 and causes the display unit 522 to display the user registered data stored in the switch memory 512 (NO in step S209 to step S210).

When the user registered data stored in the switch memory 512 are displayed by the display unit 522 but the user registered data that the user wishes to use have not been copied to the switch memory 512, these user registered data are not displayed on the touch panel 401 during the wait period, i.e. until operation preparation in the hard disk storage unit 501 is complete. In this case, the display unit 522 is preferably caused to display a message indicating that the user registered data are not all displayed on the touch panel 401 and that the user registered data will all be displayed after a predetermined time.

When the wait period ends and the activation detection unit 502 notifies the access switching unit 521 that operation preparation in the hard disk storage unit 501 is complete, access is determined to be possible. Accordingly, the access switching unit 521 switches the access destination of the user registered data from the switch memory 512 to the hard disk storage unit 501. As a result, the user registered data stored in the hard disk storage unit 501 are displayed on the touch panel 401 by the display unit 522 (YES in step S211 to step S212 to END).

When the user uses the user registered data after operation preparation in the hard disk storage unit 501 is complete, on the other hand, the display unit 522 displays the user registered data stored in the hard disk storage unit 501. More specifically, when operation preparation in the hard disk storage unit 501 is complete, the activation detection unit 502 notifies the access switching unit 521 that operation preparation in the hard disk storage unit 501 is complete. Having received an instruction to cause the display unit 522 to display the content of the facsimile item key 710, the access switching unit 521 causes the display unit 522 to display the facsimile numbers stored in the hard disk storage unit 501 (YES in step S209 to step S212). Subsequent procedures are identical to the first embodiment, and therefore description is omitted.

(Third Embodiment)

Figure 9:
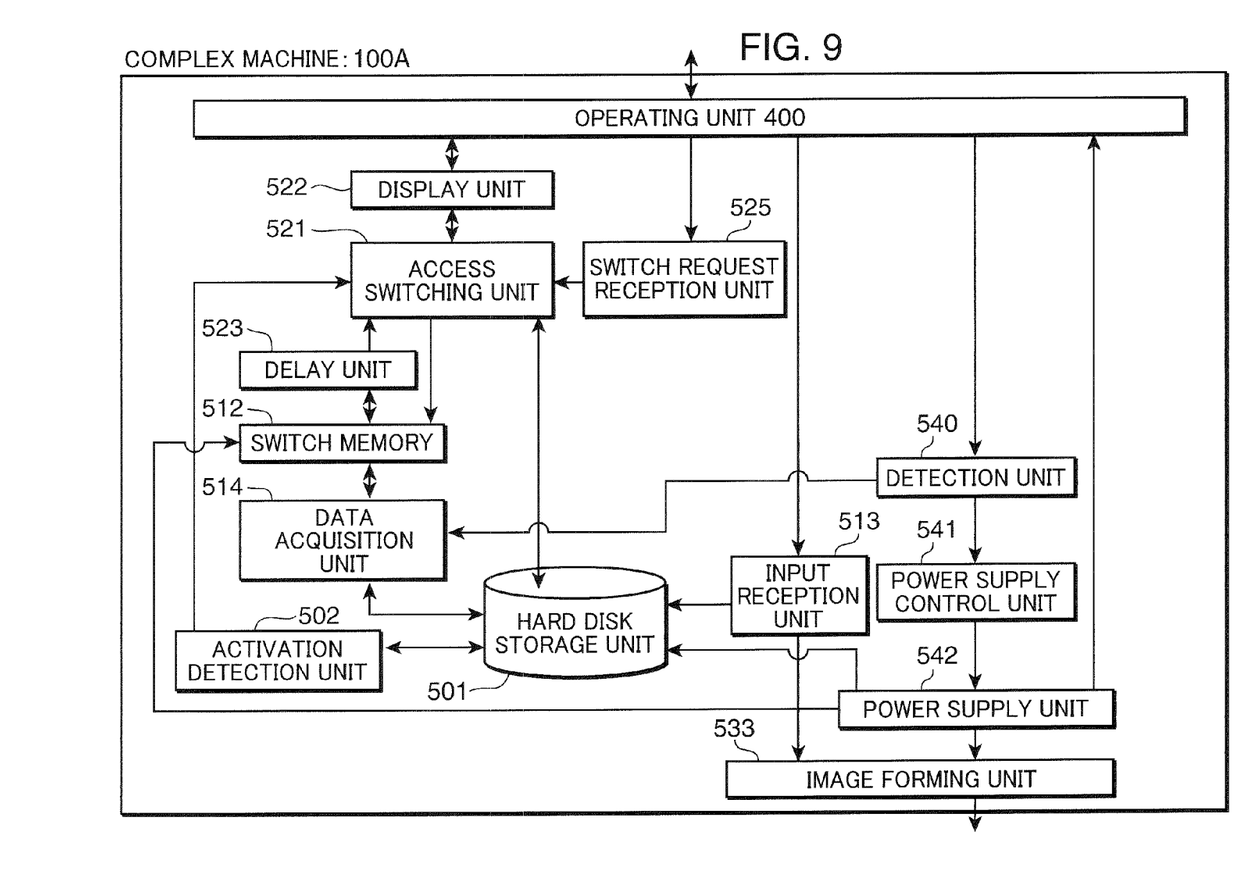
FIG. 9 is a functional block diagram of an image forming apparatus according to a third embodiment.

A complex machine 100A according to a third embodiment will now be described on the basis of FIGS. 9 and 10. FIG. 9 is a functional block diagram of the complex machine 100A according to the third embodiment, and FIG. 10 is a view showing a user registered data table, to be described below, which is stored in the hard disk storage unit 501.

The complex machine 100A according to the third embodiment differs from those of the first and second embodiments in that when the operating state of the complex machine 100A is switched from the active state to the sleep state, the user registered data stored in the hard disk storage unit 501 are copied to the switch memory 512. To detect this state transition, the complex machine 100A is provided with a detection unit 540. The detection unit 540 detects a state transition from the active state to the sleep state on the basis of depression of the power supply ON/OFF key 409. All other constitutions are identical to the first embodiment (see FIG. 5).

Figure 10:
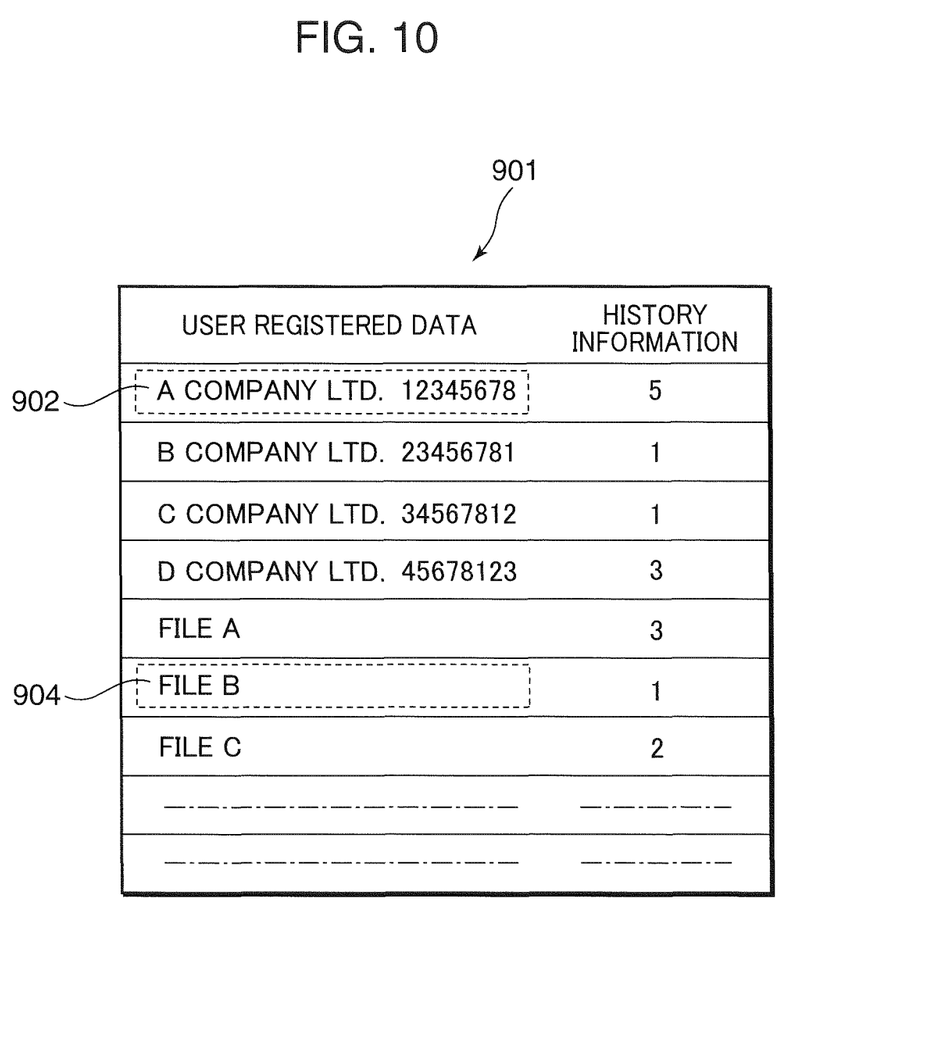
FIG. 10 is a view showing a table stored in a hard disk storage unit of the image forming apparatus according to the third embodiment.

As shown in FIG. 10, a user registered data table 901 in which the user registered data are associated with history information indicating the usage frequency of the user registered data is stored in the hard disk storage unit 501. For example, in the user registered data, "A Company Ltd. 12345678" denotes a facsimile number 902 of A Company Ltd. and "File B" denotes a "File B" 904 in a box.

When the input reception unit 513 confirms that the user has used the user registered data in step S102 of the first embodiment (see FIG. 6), the input reception unit 513 increases the usage frequency of the used user registered data in the corresponding history information of the user registered data table 901 by one.

When a predetermined job is completed and the user presses the power supply ON/OFF key 409, the detection unit 540 shown in FIG. 9 receives an instruction indicating a transition to the sleep state and issues an instruction signal to the data acquisition unit 514 to store a copy of the user registered data in the switch memory 512 from the hard disk storage unit 501. When performing the copying, the data acquisition unit 514 refers to the history information in the user registered data table 901 and copies user registered data having history information that indicates at least a predetermined usage frequency (at least two uses, for example) to the switch memory 512 from the hard disk storage unit 501. More specifically, for example, the data acquisition unit 514 copies the facsimile number 902 of A Company Ltd., the history information of which indicates "5", but does not copy the "File B" 904, the history information of which indicates "1". By performing copying in this manner, frequently used user registered data can be copied to the switch memory 512.

After receiving an instruction indicating a transition to the sleep state, the detection unit 540 generates an instruction signal to cause the power supply control unit 541 to switch the complex machine 100A to the sleep state. Upon reception of the instruction signal, the power supply control unit 541 switches the complex machine 100A to the sleep state.

When the user presses the power supply ON/OFF key 409 while the complex machine 100A is in the sleep state, the detection unit 540 receives an instruction indicating a transition to the active state and instructs the power supply control unit 541 to switch the complex machine 100A to the active state. Upon reception of this instruction, the power supply control unit 541 switches the complex machine 100A to the active state. As a result, similarly to the first and second embodiments, the display unit 522 displays the user registered data stored in the switch memory 512 on the touch panel 401.

(Other Embodiments)

(1) The complex machine 100 shown in FIG. 5 and the complex machine 100A shown in FIG. 9 both include the delay unit 523. During data access to a hard disk storage device, a period (seek time) for finding an access position on the disk and moving a head to that position is typically required. Therefore, the response time of the hard disk storage device is typically longer than the response time of a semiconductor memory. Hence, when the access switching unit 521 switches access from the switch memory 512 (a semiconductor memory) to the hard disk storage unit 501, the response time required to display the user registered data increases.

Therefore, the access switching unit 521 accesses the switch memory 512 via the delay unit 523, which delays the response time of the switch memory 512 to the response time of the hard disk storage unit 501. By having the delay unit 523 delay the response time of the switch memory 512 to the response time of the hard disk storage unit 501, the user does not feel that the response time has slowed. The length of the delay generated by the delay unit 523 is arbitrary, but the delay is preferably set to correspond to the response time of the employed hard disk storage unit 501.

(2) The user registered data of the first to third embodiments may include, for each user, an operating sequence relating to the operating keys pressed by the user when inputting a setting condition. When the user uses the complex machine 100, the operating sequence in which the user presses the operating keys of the operating unit 400 is often determined for each user according to a predetermined frequency. For example, a function unit that obtains the operating sequence for each user when a single job is executed may be provided.

Note that when an operating sequence for each user is included in the user registered data, user information (a user ID) is obtained in advance by a user authentication unit. When this constitution is employed, the access switching unit 521 obtains user registered data including the operating sequence of each user from the switch memory 512 and displays the obtained user registered data on the display unit 522, for example. The operating sequence maybe displayed on a screen (an initial screen, a setting screen, or similar) relating to the operating sequence. Moreover, when this constitution is employed, a processing sequence relating to the user is stored, and therefore the user does not have to repeat a frequently used processing sequence.

(3) The user registered data of the first to third embodiments may include, for each user, a degree of priority indicating an order of precedence which is displayed by the display unit 522. The capacity of the switch memory 512 is typically smaller than the capacity of the hard disk storage unit 501. When the access switching unit 521 displays predetermined user registered data (a facsimile number of the like) on the display unit 522 in accordance with this degree of priority, the predetermined user registered data can be displayed without impairing user-friendliness even if the capacity of the switch memory 512 is comparatively small.

(4) Further, when the data acquisition unit 514 according to the third embodiment stores the user registered data in the switch memory 512 at the start of a transition to the sleep state, the data acquisition unit 514 may switch off a backlight provided on the display unit 522 in advance. When this constitution is employed, the data acquisition unit 514 copies the user registered data in a state where the screen of the touch panel 401 on the operating unit 400 is black. Thus, the user can recognize visually that predetermined processing is complete, and as a result, a sense of unease felt by the user in relation to the processing of the data acquisition unit 514 can be eliminated.

Note that when the data acquisition unit 514 obtains the user registered data, a sleep transition time required to switch the operating state of the complex machine 100A from the active state to the sleep state differs according to the amount of obtained user registered data. Therefore, the data acquisition unit 214, power supply control unit 541, and power supply unit 542 may cooperate to adjust the sleep transition time.

According to the present invention, user registered data registered by a user, such as a facsimile number, a document file, or an image file, may be used during a wait period extending from the start of power supply to a hard disk storage unit to the completion of operation preparation in the hard disk storage unit. As a result, the user registered data can be used immediately after restoration from a sleep state.

The specific embodiments described above principally include inventions having the following constitutions.

An image forming apparatus according to an aspect of the present invention includes: a hard disk storage unit for storing user registered data registered by a user; a display unit for displaying the user registered data in a user selectable state; a power supply unit for supplying power to the hard disk storage unit; a power supply control unit for interrupting or starting power supply to the hard disk storage unit by the power supply unit; a switch memory for storing at least a part of the user registered data stored in the hard disk storage unit; and an access switching unit for displaying the user registered data stored in the switch memory on the display unit in a user selectable state when the power supply control unit starts the power supply from the power supply unit to the hard disk storage unit.

According to this constitution, the switch memory stores at least a part of the user registered data stored in the hard disk storage unit. Therefore, the user registered data stored in the switch memory are displayed on the display unit even before operation preparation in the hard disk storage unit is complete, and as a result, the user registered data required by the user can be used.

In the above constitution, the image forming apparatus can be switched between an active state in which various functions can be provided to a user and a sleep state in which power consumption is suppressed, the power supply control unit may interrupt the power supply to the hard disk storage unit in the sleep state and start the power supply to the hard disk storage unit when the image forming apparatus is switched from the sleep state to the active state, and the hard disk storage unit may enter an operable state after a predetermined wait period following the start of the power supply to the hard disk storage unit.

According to this constitution, the user registered data stored temporarily in the switch memory can be displayed on the display unit while the image forming apparatus is switched from the sleep state to the active state, and as a result, an improvement in user-friendliness can be achieved.

In the above constitution, the image forming apparatus preferably further includes: an activation detection unit for detecting completion of an operation preparation in the hard disk storage unit after the power supply control unit starts the power supply to the hard disk storage unit; and an input reception unit for receiving an operation request from the user, and after the input reception unit receives a request from the user to display the user registered data stored in the hard disk storage unit and the activation detection unit has detected completion of the operation preparation in the hard disk storage unit, the access switching unit preferably switches an access destination of the user registered data displayed on the display unit from the switch memory to the hard disk storage unit.

Alternatively, the image forming apparatus preferably further includes an activation detection unit for detecting completion of the operation preparation in the hard disk storage unit after the power supply control unit starts the power supply to the hard disk storage unit, the access switching unit preferably displays the user registered data stored in the switch memory on the display unit in a user selectable state from the start of the power supply to the hard disk storage unit to the end of a wait period in which the activation detection unit detects completion of the operation preparation in the hard disk storage unit, and when the activation detection unit detects completion of the operation preparation in the hard disk storage unit, an access destination of the user registered data displayed on the display unit is preferably switched from the switch memory to the hard disk storage unit.

According to these constitutions, the switch memory can be set as the access destination of the user registered data displayed on the display unit until operation preparation in the hard disk storage unit is complete, and when operation preparation in the hard disk storage unit is complete, the hard disk storage unit can be set as the access destination of the user registered data. Hence, the user can use the user registered data at all times.

In the above constitution, the image forming apparatus preferably further includes an input reception unit for receiving a selection of specific user registered data from among the user registered data stored in the hard disk storage unit, and the switch memory preferably stores the user registered data received by the input reception unit.

According to this constitution, the user registered data received by the input reception unit are stored, and therefore the user registered data that are actually used by the user are stored in the switch memory. Hence, user registered data that are more likely to be used can be stored preferentially in the switch memory.

In the above constitution, the image forming apparatus preferably further includes a delay unit that delays a response time required to display the user registered data stored in the switch memory on the display unit by a predetermined time. According to this constitution, the user does not feel that the response time has slowed when the access destination of the user registered data is switched from the switch memory to the hard disk storage unit.

In the above constitution, the hard disk storage unit may store a user registered data table created by associating the user registered data with frequency data indicating a usage frequency of the user registered data, and when the power supply control unit interrupts the power supply to the hard disk storage unit from the power supply unit, the switch memory may obtain the user registered data from the hard disk storage unit and store the obtained user registered data on the basis of the user registered data table.

According to this constitution, frequently used user registered data can be stored in the switch memory and displayed on the display unit preferentially.

In the above constitution, the switch memory is preferably a volatile memory that receives power supply from the power supply unit or another power source constantly. According to this constitution, user registered data writing can be executed many times.

Further, the user registered data preferably include a facsimile number.

A data display method according to another aspect of the present invention is a method for displaying user registered data stored in a hard disk storage unit on a display unit, and includes: preparing a state in which at least a part of the user registered data stored in the hard disk storage unit is stored in a switch memory before power supply to the hard disk storage unit is started; starting the power supply to the hard disk storage unit; displaying the user registered data stored in the switch memory on the display unit after the power supply to the hard disk storage unit is started until operation preparation in the hard disk storage unit is complete; and switching a data access destination when the operation preparation in the hard disk storage unit is complete such that the user registered data stored in the hard disk storage unit, rather than the switch memory, are displayed on the display unit.

According to this data display method, the switch memory can be set as the access destination of the user registered data displayed on the display unit from the start of power supply to the hard disk storage unit to the completion of operation preparation therein, and when operation preparation in the hard disk storage unit is complete, the hard disk storage unit can be set as the access destination of the user registered data. As a result, the user can use the user registered data at all times.

This application is based on Japanese patent application serial No. 2009-050468 filed in Japan Patent Office on Mar. 4, 2009, the contents of which are hereby incorporated by reference.

The specific embodiments and examples in the detailed description of the invention are merely intended to clarify the technical contents of the present invention. Therefore, it is understood that the present invention should not be interpreted narrowly within only these embodiments and examples, and various modifications and variations can be devised within the scope of the spirit of the present invention and the following claims.

What is claimed is:

1. An image forming apparatus comprising:
a hard disk storage unit for storing user registered data registered by a user;
a display unit for displaying the user registered data in a user selectable state;
a power supply unit for supplying power to the hard disk storage unit;
a power supply control unit for interrupting or starting power supply to the hard disk storage unit by the power supply unit;
an input reception unit for receiving a selection of a specific user registered data from among the user registered data stored in the hard disk storage unit;
a switch memory for storing at least a part of the user registered data stored in the hard disk storage unit, the switch memory being capable of reading data without the need for a wait period following energization;
a data acquisition unit for performing processing to store in the switch memory a copy of the specific user registered data from among the user registered data stored in the hard disk storage unit when the input reception unit has received the selection of the specific user registered data;
an access switching unit for displaying the specific user registered data stored in the switch memory on the display unit in a user selectable state when the power supply control unit starts the power supply from the power supply unit to the hard disk storage unit; and
a delay unit that delays a response time required to display the specific user registered data stored in the switch memory on the display unit by a response time of the hard disk unit.

2. The image forming apparatus according to claim 1, wherein the image forming apparatus can be switched between an active state in which various functions can be provided to a user and a sleep state in which power consumption is suppressed,
the power supply control unit interrupts the power supply to the hard disk storage unit in the sleep state and starts the power supply to the hard disk storage unit when the image forming apparatus is switched from the sleep state to the active state, and
the hard disk storage unit enters an operable state after a predetermined wait period following the start of the power supply to the hard disk storage unit.

3. The image forming apparatus according to claim 1, further comprising:

an activation detection unit for detecting completion of an operation preparation in the hard disk storage unit after the power supply control unit starts the power supply to the hard disk storage unit; wherein the input reception unit receives an operation request from the user, and after the input reception unit receives a request from the user to display the user registered data stored in the hard disk storage unit and the activation detection unit has detected completion of the operation preparation in the hard disk storage unit, the access switching unit switches an access destination of the user registered data displayed on the display unit from the switch memory to the hard disk storage unit.

4. The image forming apparatus according to claim 1, further comprising an activation detection unit for detecting completion of the operation preparation in the hard disk storage unit after the power supply control unit starts the power supply to the hard disk storage unit, wherein the access switching unit displays the specific user registered data stored in the switch memory on the display unit in a user selectable state from the start of the power supply to the hard disk storage unit to the end of a wait period in which the activation detection unit detects completion of the operation preparation in the hard disk storage unit, and when the activation detection unit detects completion of the operation preparation in the hard disk storage unit, an access destination of the specific user registered data displayed on the display unit is switched from the switch memory to the hard disk storage unit.

5. The image forming apparatus according to claim 1, wherein the hard disk storage unit stores a user registered data table created by associating the user registered data with frequency data indicating a usage frequency of the user registered data, and when the power supply control unit interrupts the power supply to the hard disk storage unit from the power supply unit, the switch memory obtains the user registered data from the hard disk storage unit and stores the obtained user registered data on the basis of the user registered data table.

6. The image forming apparatus according to claim 1, wherein the switch memory is a volatile memory that receives power supply from the power supply unit or another power source constantly.

7. The image forming apparatus according to claim 1, wherein the user registered data include a facsimile number.

8. The image forming apparatus according to claim 1, wherein the data acquisition unit performs processing to store a copy of only specific user registered data indicating reuse, stored in the hard disk storage unit in the switch memory after making information for asking whether the specific user registered data received by the input reception unit is used.

9. The image forming apparatus according to claim 5, wherein the switch memory only stores the obtained user registered data having frequency data that surpasses a predetermined usage frequency from the hard disk storage unit.

10. The image forming apparatus according to claim 1, wherein in case where the user registered data have not been stored to the switch memory, the display unit displays a first message indicating that not all of these specific user registered data are displayed when the access switching unit cause the display unit to display.

11. The image forming apparatus according to claim 10, wherein the display unit displays a second message indicating that the user registered data will all be displayed after a predetermined time.

12. The image forming apparatus according to claim 1, wherein the image forming apparatus can be switched between an active state in which various functions can be provided to a user and a sleep state in which power consumption is suppressed, and the data acquisition unit performs processing to store a copy of these specific user registered data stored in the hard disk storage unit in the switch memory when the operating state is switched from the active state to the sleep state.

13. A data display method for displaying user registered data stored in a hard disk storage unit on a display unit, comprising:

preparing a state in which at least a part of the user registered data stored in the hard disk storage unit is stored in a switch memory before power supply to the hard disk storage unit is started;

starting the power supply to the hard disk storage unit;

displaying the user registered data stored in the switch memory on the display unit after the power supply to the hard disk storage unit is started until operation preparation in the hard disk storage unit is complete; and switching a data access destination when the operation preparation in the hard disk storage unit is complete such that the user registered data stored in the hard disk storage unit, rather than the user registered data stored in the switch memory, are displayed on the display unit, wherein:

the step of preparing the state in which at least the user registered data is stored in the switch memory is realized by storing a copy of specific user registered data that is stored in the hard disk storage unit and received by an input reception unit that receives a selection of the specific user registered data from among the user registered data stored in the hard disk storage unit, the specific user registered data stored in the switch memory by copying is displayed subject to a delay of a predetermined time that corresponds to a response time of the hard disk storage unit in the step of displaying the user registered data on the display unit, and the data access destination is switched in such a manner that the specific user registered data stored in the hard disk storage unit is displayed on the display in the step of switching the data access destination.

14. The data displayed method of claim 13, wherein the specific user registered data is selected by the user.

15. The data displayed method of claim 13, wherein the specific user registered data is selected based on most frequently used user registered data.

16. The data displayed method of claim 13, wherein the specific user registered data is selected based on most recently used user registered data.

* * * * *